(12) United States Patent
Dowty et al.

(10) Patent No.: US 11,230,382 B2
(45) Date of Patent: Jan. 25, 2022

(54) COMBINED DIVAN AIRCRAFT SEAT FOR AIRCRAFT PASSENGER COMPARTMENT SUITES

(71) Applicant: B/E Aerospace, Inc., Winston-Salem, NC (US)

(72) Inventors: Mark B. Dowty, Rural Hall, NC (US); Robert J. Henshaw, Newnan, GA (US); Suzuko Hisata, Atlanta, GA (US); Robert D. Wilkey, Atlanta, GA (US); Glenn A. Johnson, Rural Hall, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 130 days.

(21) Appl. No.: 16/782,536

(22) Filed: Feb. 5, 2020

(65) Prior Publication Data
US 2021/0237879 A1    Aug. 5, 2021

(51) Int. Cl.
*B64D 11/06*    (2006.01)
*B64D 11/00*    (2006.01)

(52) U.S. Cl.
CPC ........ *B64D 11/0606* (2014.12); *B64D 11/003* (2013.01); *B64D 11/0641* (2014.12);
(Continued)

(58) Field of Classification Search
CPC ............ B64D 2011/00; B64D 11/0606; B64D 11/0641; B64D 11/0604; B64D 2011/0069
See application file for complete search history.

(56) References Cited

U.S. PATENT DOCUMENTS

| 5,921,629 | A | 7/1999 | Koch et al. |
| 8,177,165 | B2 * | 5/2012 | Bettell ............... B64D 11/0605 244/118.6 |

(Continued)

FOREIGN PATENT DOCUMENTS

| CA | 2855449 A1 | 1/2016 |
| DE | 202016102640 U1 | 7/2016 |

(Continued)

OTHER PUBLICATIONS

Extended Search Report for European Application No. 21154828.4 dated Jun. 17, 2021, 8 pages.

*Primary Examiner* — Philip J Bonzell
*Assistant Examiner* — Tye William Abell
(74) *Attorney, Agent, or Firm* — Suiter Swantz pc llo (57) ABSTRACT

An aircraft passenger compartment suite may include at least one single passenger compartment including at least one single aircraft seat. The at least one single aircraft seat may be configured to seat a single passenger. The aircraft passenger compartment suite may include a combined divan passenger compartment with a combined divan aircraft seat. The combined divan aircraft seat may be configured to seat at least one passenger. The combined divan aircraft seat may have a width greater than a width of the at least one single aircraft seat. The combined divan passenger compartment may include a stowage compartment configured to stow large passenger amenities in a substantially vertical orientation. The aircraft passenger compartment suite may include a privacy divider separating the combined divan passenger compartment and the at least one single passenger compartment.

13 Claims, 6 Drawing Sheets

(52) U.S. Cl.
CPC ............. *B64D 2011/0046* (2013.01); *B64D 2011/0069* (2013.01)

(56) References Cited

U.S. PATENT DOCUMENTS

| | | |
|---|---|---|
| 9,096,322 B2 | 8/2015 | Hasegawa et al. |
| 9,308,999 B2 | 4/2016 | Joffre |
| 9,446,848 B2 | 9/2016 | Jerome et al. |
| 9,545,999 B2 | 1/2017 | Henshaw |
| 9,610,919 B2 | 4/2017 | Taubert et al. |
| 9,963,235 B2 | 5/2018 | Joffre et al. |
| 2002/0167207 A1 | 11/2002 | Larson |
| 2005/0001097 A1* | 1/2005 | Saint-Jaimes ...... B64D 11/0023 244/118.6 |
| 2005/0023413 A1* | 2/2005 | Saint-Jaimes ...... B64D 11/0023 244/118.6 |
| 2011/0226900 A1 | 9/2011 | Bamford et al. |
| 2012/0318918 A1* | 12/2012 | Johnson ................ B64D 11/06 244/118.6 |
| 2014/0246886 A1 | 9/2014 | Savard et al. |
| 2015/0166183 A1* | 6/2015 | Henshaw ........... B64D 11/0641 244/118.6 |
| 2016/0001886 A1 | 1/2016 | Fullerton |
| 2018/0281963 A1* | 10/2018 | Dowty ................. B64C 1/1461 |
| 2018/0281964 A1* | 10/2018 | Carlioz .............. B64D 11/0604 |
| 2019/0071182 A1 | 3/2019 | Ward |
| 2019/0225340 A1* | 7/2019 | Lee .................... B64D 11/0601 |

FOREIGN PATENT DOCUMENTS

| | | |
|---|---|---|
| EP | 0936121 B1 | 9/2003 |
| EP | 1888405 B1 | 9/2016 |
| EP | 3174792 A1 | 6/2017 |
| EP | 3437996 A1 | 2/2019 |
| EP | 3822169 A1 | 5/2021 |
| WO | 2021074686 A1 | 4/2021 |

* cited by examiner

COMBINED DIVAN AIRCRAFT SEAT FOR AIRCRAFT PASSENGER COMPARTMENT SUITES

BACKGROUND

In commercial transportation vehicles such as passenger aircraft, an aircraft passenger compartment suite may include one or more double aircraft seat compartments. The double seat compartments may separate the aircraft passenger compartment suite into individual passenger environments. The double seat compartments may be accessible from separate aisles. The double seat compartments may be facing the same direction or different directions within the passenger aircraft.

SUMMARY

An aircraft passenger compartment suite in an aircraft cabin of a passenger aircraft is disclosed, in accordance with one or more embodiments of the disclosure. The aircraft passenger compartment suite may include at least one single passenger compartment including at least one single aircraft seat. The at least one single aircraft seat may be configured to seat a single passenger. The aircraft passenger compartment suite may include a combined divan passenger compartment with a combined divan aircraft seat. The combined divan aircraft seat may be configured to seat at least one passenger. The combined divan aircraft seat may have a width greater than a width of the at least one single aircraft seat. The aircraft passenger compartment suite may include a privacy divider separating the combined divan passenger compartment and the at least one single passenger compartment.

In some embodiments, the combined divan aircraft seat may be configured to actuate between a combined divan upright position and a combined divan lie-flat position.

In some embodiments, the combined divan aircraft seat in the combined divan passenger compartment may face forward within the aircraft cabin. The at least one single aircraft seat in the at least one single passenger compartment may face rearward within the aircraft cabin.

In some embodiments, the combined divan aircraft seat in the combined divan passenger compartment may face rearward within the aircraft cabin. The at least one single aircraft seat in the at least one single passenger compartment may face forward within the aircraft cabin.

In some embodiments, the combined divan aircraft seat in the combined divan passenger compartment and the at least one single aircraft seat in the at least one single passenger compartment may face outward from the privacy divider.

In some embodiments, the combined divan aircraft seat in the combined divan passenger compartment and the at least one single aircraft seat in the at least one single passenger compartment may face inward toward the privacy divider.

In some embodiments, a portion of the combined divan aircraft seat may be configured to be positioned underneath the privacy divider when the combined divan aircraft seat is in the combined divan lie-flat position.

In some embodiments, the combined divan aircraft seat may include a primary section and an auxiliary section. The primary section may be configured to actuate between the combined divan upright position and the combined divan lie-flat position.

In some embodiments, the combined divan passenger compartment may include an ottoman proximate to the combined divan aircraft seat.

In some embodiments, the combined divan aircraft seat and the ottoman may be configured to form a bed surface when the combined divan aircraft seat is in the combined divan lie-flat position and the ottoman is in an ottoman lie-flat position.

In some embodiments, the ottoman may be positioned underneath a monument of the privacy divider.

In some embodiments, the aircraft passenger compartment suite may include a privacy shell including at least one privacy shell element. The at least one privacy shell element may be configured to conform to a portion of the combined divan aircraft seat.

In some embodiments, the combined divan passenger compartment may include a stowage compartment configured to stow large passenger amenities in a substantially vertical orientation. The stowage compartment may be proximate to the combined divan aircraft seat. The aircraft passenger compartment suite may be positioned within a passenger aircraft between a first aisle and a second aisle. The at least one passenger compartment may be accessible from the first aisle. The stowage compartment of the at least one passenger compartment may prevent access from the second aisle.

In some embodiments, the stowage compartment may include a door.

An aircraft passenger compartment suite in an aircraft cabin of a passenger aircraft is disclosed, in accordance with one or more embodiments of the disclosure. The aircraft passenger compartment suite may include a combined divan passenger compartment with a combined divan aircraft seat. The combined divan aircraft seat may be configured to seat at least one passenger. The combined divan aircraft seat may have a width greater than a width of a single aircraft seat. The combined divan passenger compartment may include a stowage compartment configured to stow large passenger amenities in a substantially vertical orientation. The stowage compartment may be proximate to the combined divan aircraft seat. The aircraft passenger compartment suite may be positioned within a passenger aircraft between a first aisle and a second aisle. The at least one passenger compartment may be accessible from the first aisle. The stowage compartment of the at least one passenger compartment may prevent access from the second aisle.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

FIGS. 1-4 generally illustrate an aircraft passenger compartment suite including a combined divan aircraft seat, in accordance with one or more embodiments of the disclosure.

In commercial transportation vehicles such as passenger aircraft, an aircraft passenger compartment suite may include one or more double aircraft seat compartments. The double seat compartments may separate the aircraft passenger compartment suite into individual passenger environments. The double seat compartments may be accessible from separate aisles. The double seat compartments may be facing the same direction or different directions within the passenger aircraft.

To allow for a more shareable seating experience during select stages of flight, a combined divan aircraft seat may be usable in place of the double seat compartments. As such, it would be beneficial to provide an aircraft passenger compartment suite including a combined divan aircraft seat.

FIGS. 1-3B illustrate an aircraft passenger compartment suite 100, in accordance with one or more embodiments of the disclosure.

The aircraft passenger compartment suite 100 may be positioned within an aircraft cabin. The aircraft passenger compartment suite 100 may include one or more sides. For example, the aircraft passenger compartment suite 100 may include a side 102 and a side 104 separated by a privacy divider 106. The aircraft passenger compartment suite 100 may include one or more aircraft passenger compartments 100a. For example, the aircraft passenger compartment suite 100 may include one or more aircraft passenger compartments 100a within the side 102 and/or one or more aircraft passenger compartments 100a within the side 104.

The aircraft passenger compartment suite 100 may include a privacy shell with one or more privacy shell elements 108. The privacy shell may include an opening 110 within the one or more privacy shell elements 108 into the aircraft passenger compartment 100a, the opening 110 configured to lead to an aisle of the aircraft cabin. The aircraft passenger compartment suite 100 may include a door for the opening 110. For example, the door may swing or slide into an open position against a privacy shell element 108. By way of another example, a privacy shell element 108 may be at least partially hollow, and the door may be slid into a cavity defined in the one or more privacy shell elements 108.

The aircraft passenger compartment 100a may include one or more single aircraft seats 112 (or standard-width aircraft seats 112) configured to seat a single passenger. For example, the aircraft passenger compartment 100a may include one aircraft seat 112. By way of another example, the aircraft passenger compartment 100a may include two aircraft seats 112. An aircraft seat 112 may include one or more aircraft seat sections. For example, the aircraft seat 112 may include a primary section 114 and an auxiliary section 116. By way of another example, the aircraft seat 112 may include a single section 114. Generally, the aircraft seat 112 may include any number of sections.

The aircraft passenger compartment 100a may include one or more combined divan aircraft seats 118 (or wide aircraft seats 118). A combined divan aircraft seat 118 may include one or more aircraft seat sections. For example, the combined divan aircraft seat 118 may include a primary section 120 and an auxiliary section 122. By way of another example, the combined divan aircraft seat 118 may include a single section 120. Generally, the combined divan aircraft seat 118 may include any number of sections.

The aircraft seats 112, 118 may be translatable (e.g., trackable or slidable). The aircraft seats 112, 118 may be rotatable about an axis cross-wise through the aircraft seats 112, 118 into a position including, but not limited to, an upright or raised position, one or more reclined positions, and/or a bed or lie-flat position. The aircraft seats 112, 118 may be rotatable about an axis (e.g., swivelable). The aircraft seats 112, 118 may be fully positionable between the outer limits of motion as defined by the moveable components of the aircraft seats 112, 118, and/or other monuments of the aircraft passenger compartment 100a. It is noted herein a fully upright or raised position may be considered a taxi, takeoff, or landing (TTOL) position during select stages of flight (though the upright position is not limited to use during the select stages of flight as the TTOL position, but also may be used at any point during the flight), for purposes of the present disclosure. In addition, it is noted herein that any position that does not meet the above-defined requirements of the TTOL position may be considered a non-TTOL position, for purposes of the present disclosure. Further, it is noted herein the aircraft seats 112, 118 may be actuatable (e.g., translatable and/or rotatable) from the TTOL position to a non-TTOL position, and/or vice versa.

A privacy shell element 108 proximate to the aircraft seats 112, 118 may be configured to conform to at least a portion of the aircraft seats 112, 118. For example, the privacy shell element 108 may include a first section configured to conform to a first portion of the aircraft seats 112, 118 (e.g., a backrest) and a second section configured to conform to a second portion of the aircraft seats 112, 118. For instance, the first section of the privacy shell element 108 may be configured to extend into an exterior living space of a passenger aircraft a select amount. Where the aircraft seats 112, 118 are offset from one another, different portions of corresponding privacy shell elements 108 may extend into the exterior living space of the passenger aircraft. In this regard, where multiple aircraft passenger compartment suites 100 are installed within a passenger aircraft, adjacent aircraft passenger compartment suites 100 may include complementary privacy shell elements 108, which may allow for a first section of a first privacy shell element 108 of a first aircraft passenger compartment suite 100 to engage (e.g., receive, interlock, or the like) with a second section of a second privacy shell element 108 of a second (e.g., adjacent) aircraft passenger compartment suite 100.

It is noted herein the complementary privacy shell elements 108 of the adjacent aircraft passenger compartment suites 100 may allow for the multiple aircraft passenger compartment suites 100 to be installed within the passenger aircraft in a more compact arrangement. In addition, it is noted herein the complementary privacy shell elements 108 of the adjacent aircraft passenger compartment suites 100 may allow for a reduction in the amount of passenger aircraft living space taken up by an aircraft passenger compartment suite 100, as compared to an amount of exterior living space taken up by an aircraft passenger compartment suite 100 with curved or rounded privacy shell elements 108.

The combined divan aircraft seat 118 may be wider than the aircraft seat 112. For example, the combined divan aircraft seat 118 may be the width equal to a width of a bedroom mattress when the combined divan aircraft seat 118 is in the lie-flat position. For instance, the combined divan aircraft seat 118 may have a width equal to a width of a full or double mattress, a queen mattress, a king mattress, a California king mattress, or other mattress. By way of another example, the combined divan aircraft seat 118 may be the width of two aircraft seats 112.

In general, the combined divan aircraft seat 118 may be configured to fit within a space for a pair of adjacent aircraft seats 112 (e.g., a double aircraft seat). For example, the combined divan aircraft seat 118 may be installed during the manufacture and assembly of the passenger aircraft compartment suite 100, without causing the aircraft passenger compartment suite 100 to take up more exterior living space of the passenger aircraft than a version including the pair of adjacent aircraft seats 112. By way of another example, the passenger aircraft compartment suite 100 may be convertible between the pair of adjacent aircraft seats 112 and the combined divan aircraft seat 118 (e.g., by ground crew, by onboard crew members, or via retrofitting). In this regard, an airline may choose to build a First Class spatial interior or convert an area of the passenger aircraft between a Business Class spatial interior and a First Class spatial interior, retaining a more compact arrangement and reducing an amount of passenger aircraft living space taken up by the aircraft passenger compartment suite 100.

Figure 2A:
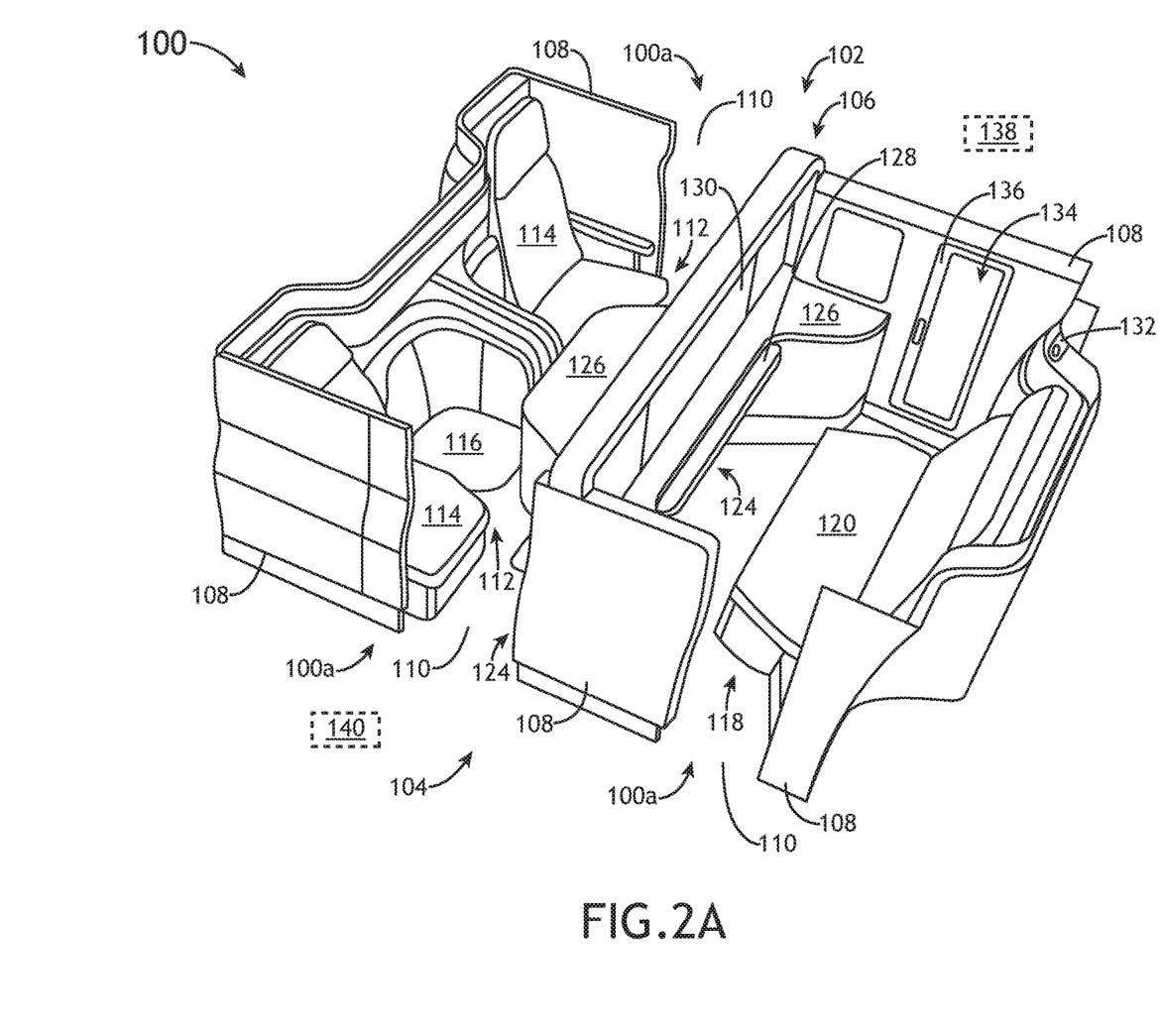
FIG. 2A illustrates an aircraft passenger compartment suite including a combined divan aircraft seat, in accordance with one or more embodiments of the disclosure.
Figure 3A:
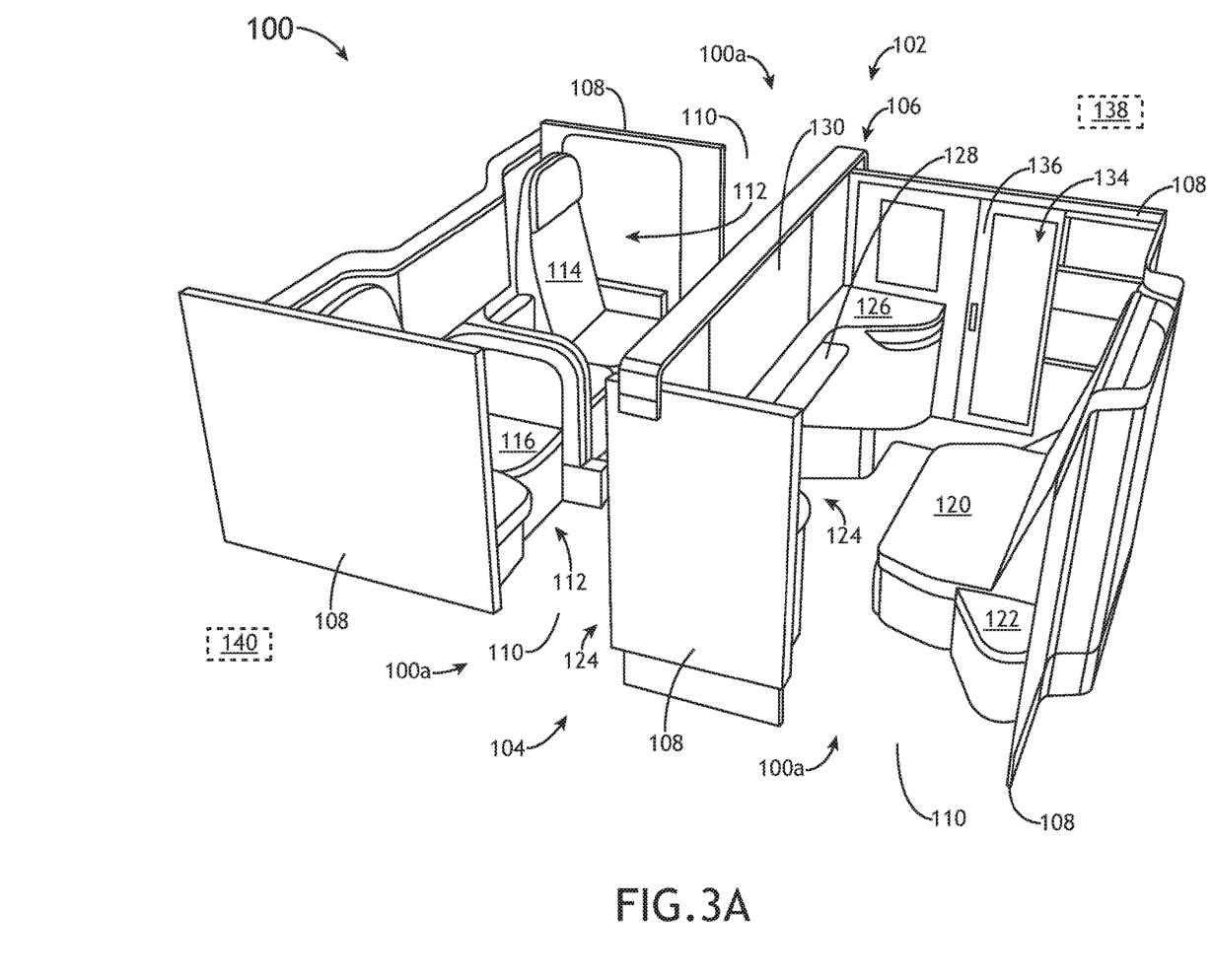
FIG. 3A illustrates an aircraft passenger compartment suite including a combined divan aircraft seat, in accordance with one or more embodiments of the disclosure.

Referring now to FIGS. 2A and 3A, the combined divan aircraft seat 118 may be in an upright position. The combined divan aircraft seat 118 may form a wide seating area or surface when the combined divan aircraft seat 118 is in the upright position. The wide seating area or surface may be configured to seat one or more passengers. For example, the primary section 120 may be configured to seat a passenger occupying the aircraft passenger compartment suite 100 and a guest passenger. By way of another example, the auxiliary section 122 may be configured to seat additional guest passengers when the combined divan aircraft seat 118 is in the upright position. It is noted herein the increased width of the combined divan aircraft seat 118 may provide for the aircraft passenger compartment suite 100 to be used as a shared, social environment for guest passengers in addition to usage by the passenger occupying the aircraft passenger compartment suite 100.

Figure 2B:
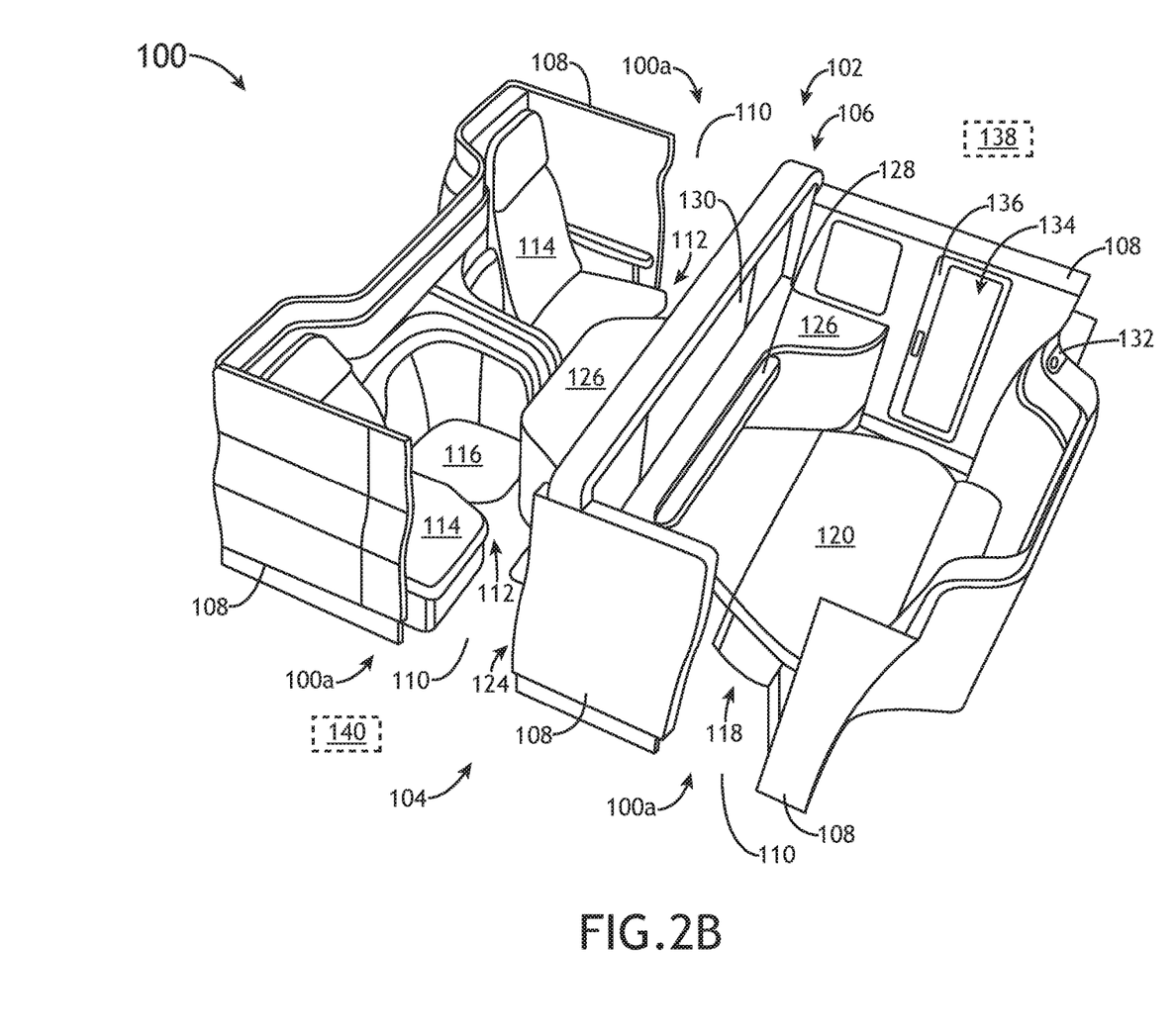
FIG. 2B illustrates an aircraft passenger compartment suite including a combined divan aircraft seat, in accordance with one or more embodiments of the disclosure.
Figure 3B:
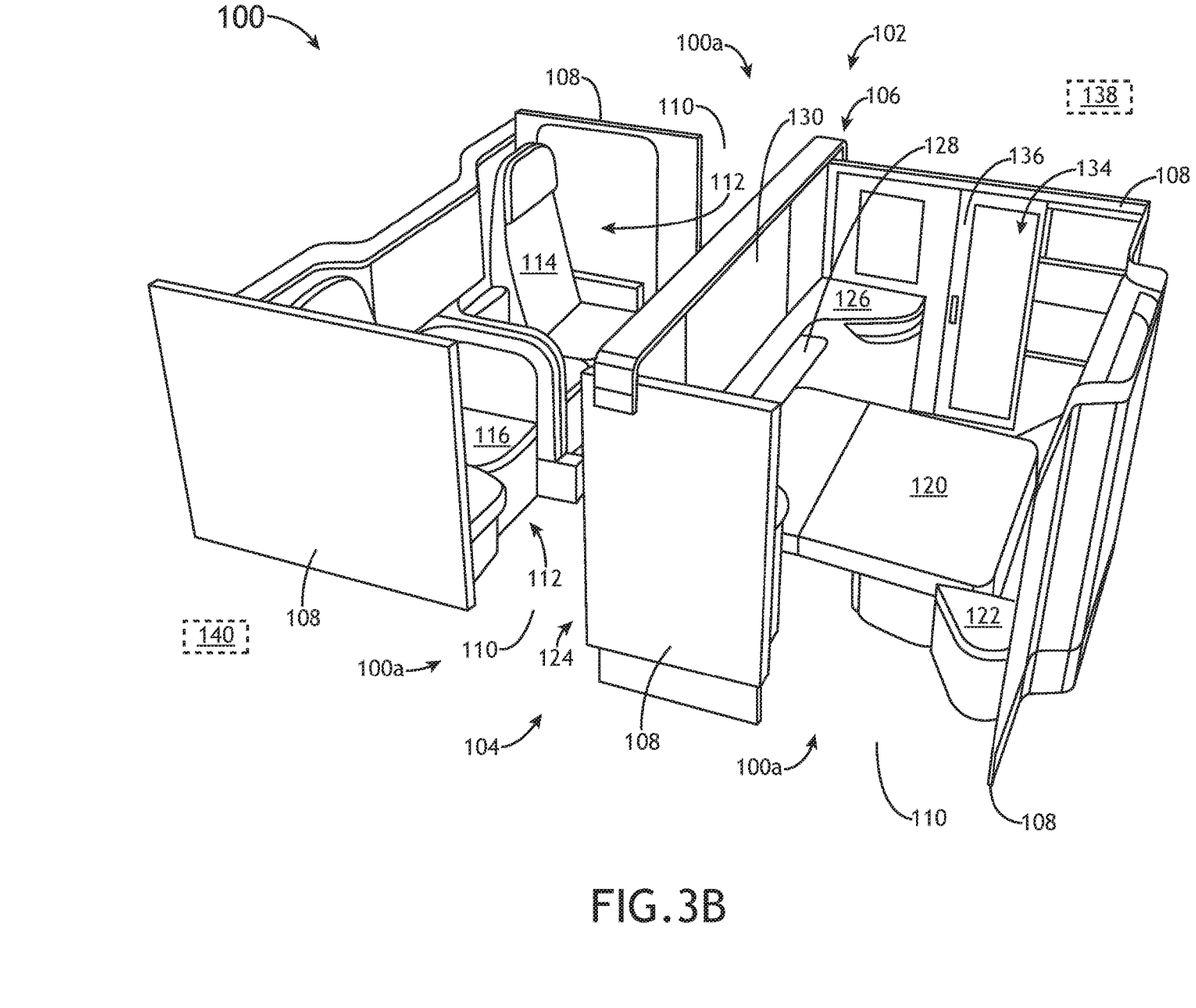
FIG. 3B illustrates an aircraft passenger compartment suite including a combined divan aircraft seat, in accordance with one or more embodiments of the disclosure.

Referring now to FIGS. 2B and 3B, the combined divan aircraft seat 118 may be a lie-flat position. For example, the combined divan aircraft seat 118 may form a lie-flat area or surface when the combined divan aircraft seat 118 is in the lie-flat position. For instance, the wide lie-flat area or surface may provide increased width for portions of a passenger's upper body (e.g., torso, arms, shoulders, head, or the like). In addition, the wide lie-flat area or surface may provide an area to be used as a surface for the passenger's belongings (e.g., similar to a nightstand or end table).

It is noted herein that an auxiliary seatback portion of the combined divan aircraft seat 118 (e.g., a cushion, or other portion of the auxiliary section) may remain coupled or attached to the privacy shell element 108. For example, a gap may exist between an auxiliary seat base portion and the auxiliary seatback portion of the combined divan aircraft seat 118 (e.g., an air gap, a gap configured to hold a pillow for a passenger when the combined divan aircraft seat 118 is in the lie-flat position) when the combined divan aircraft seat 118 is in the lie-flat position. The gap may represent a spacing between the auxiliary seat base portion and the auxiliary seatback portion of the combined divan aircraft seat 118 (e.g., a spacing where a portion of a privacy shell element 108 be may observed). The gap may contribute to the wide lie-flat area or surface providing increased width for portions of a passenger's upper body (e.g., torso, arms, shoulders, head, or the like). It is noted herein, however, that the entirety of the combined divan aircraft seat 118 may actuate into the lie-flat position.

It is noted herein the combined divan aircraft seat 118 may transition directly between the upright position and the lie-flat position. In addition, it is noted herein the combined divan aircraft seat 118 may transition through one or more reclined positions between the upright position and the lie-flat position. Further, it is noted herein the combined divan aircraft seat 118 may transition into one or more reclined positions in a motion separate from the transition between the upright position and the lie-flat position. Therefore, the above description should not be interpreted as a limitation on the scope of the disclosure but merely an illustration.

It is noted herein the one or more single aircraft seats 112 may also be configured to transition between an upright position, one or more reclined positions, and/or a lie-flat position. As such, any embodiments directed to the transitioning of the combined divan aircraft seat 118 may be directed to a transitioning of the one or more single aircraft seats 112. Therefore, the above description should not be interpreted as a limitation on the scope of the disclosure but merely an illustration.

The aircraft seats 112, 118 may be proximate to an ottoman 124 of the aircraft passenger compartment suite 100 when in the lie-flat position, such that the aircraft seats 112, 118 and the ottoman 124 may form the lie-flat surface when the aircraft seats 112, 118 and the ottoman 124 are each in a lie-flat position.

The ottoman 124 may be positioned underneath a monument 126 of the privacy divider 106. For example, a monument 126 may include, but is not limited to, a tray or table 128, a side stand, or the like. Where the monument 126 includes a tray or table 128, the tray or table may include a top surface, a bottom surface, and/or one or more side surfaces. For example, the tray 128 may include a single continuous side surface where all corners are rounded. By way of another example, the tray may include up to an N number of side surfaces where the tray 128 includes up to an N number of corners. The tray 128 may be fixed in position. It is noted herein, however, that the tray 128 may be actuatable (e.g., may extend a select distance from a stowed position to an extended position proximate to a passenger).

The ottoman 124 may be positioned within a footwell of the aircraft passenger compartment suite 100. For instance, one or more dimensions of the footwell may be changed by transitioning the aircraft seats 112, 118 between an upright position, a reclined position, and/or the lie-flat position. It is noted herein that a portion of the ottoman 124 may be actuatable (e.g., along a set of tracks or linear rails) to a position outside of the footwell.

The ottoman 124 may be configured to translate and/or rotate about an axis through a sidewall of the ottoman to point a top surface to a passenger occupying the aircraft seats 112, 118. For example, where the ottoman 124 may be configured to both translate and rotate, the ottoman 124 may be configured to independently rotate and/or translate. By way of another example, where the ottoman 124 may be configured to both translate and rotate, a rotation may prevent further translation until the ottoman 124 is returned to a select position and/or a translation may prevent further rotation until the ottoman 124 is returned to a select position.

It is noted herein, however, the aircraft seats 112, 118 and/or the ottoman 124 may be limited to an upright position and/or one or more reclined positions. In addition, it is noted herein the aircraft seats 112, 118 may be the sole component forming a bed when the aircraft seats 112, 118 are in a lie-flat position. Therefore, the above description should not be interpreted as a limitation on the present disclosure but merely an illustration.

Figure 1:
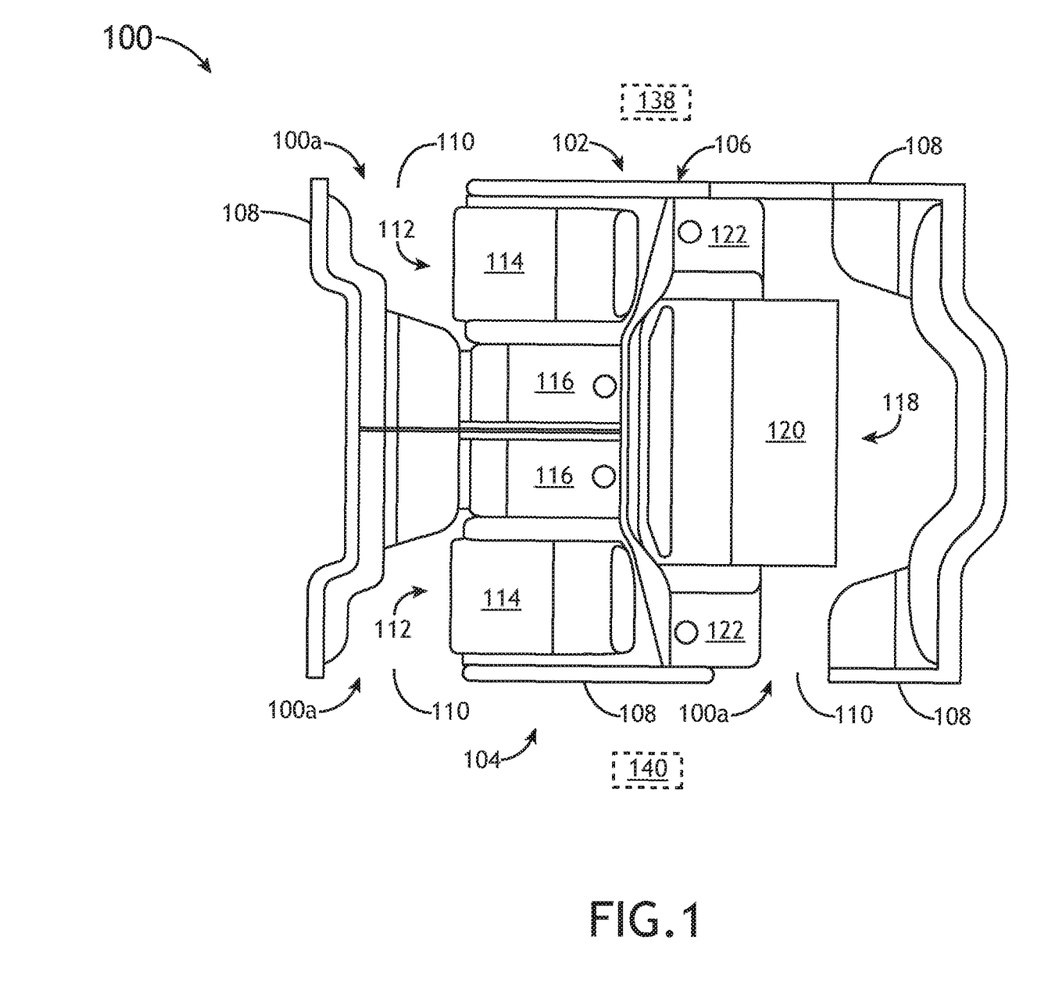
FIG. 1 illustrates an aircraft passenger compartment suite including a combined divan aircraft seat, in accordance with one or more embodiments of the disclosure.

In one example, as illustrated in FIG. 1, the one or more single aircraft seats 112 and the combined divan aircraft seat 118 may be proximate to one another, though separated by the privacy divider 106. For instance, the one or more single aircraft seats 112 and the combined divan aircraft seat 118 may face outward from the privacy divider 106. In another example, as illustrated in FIGS. 2A-3B, the ottomans 124 of the aircraft seats 112, 118 may be proximate to one another and positioned under respective monuments 126 of the privacy divider 106. For instance, the aircraft seats 112, 118 may face inward toward the privacy divider 106. Therefore, the above description should not be interpreted as a limitation on the present disclosure but merely an illustration.

The aircraft passenger compartment 100*a* of the aircraft passenger compartment suite 100 may include one or more passenger in-flight entertainment devices (IFEs). For example, the one or more IFEs may include, but are not limited to, one or more widescreen display devices 130 coupled to and/or positioned proximate to the privacy divider 106.

The one or more widescreen display devices 130 may include a collapsible screen (e.g., a screen capable of transitioning between a stowed position and a deployed position). For example, the collapsible screen may be a standalone display device (e.g., a roll-up light-emitting-diode (LED) screen, or the like) configured to receive a signal, generate an image output based on the signal, and display the image output. By way of another example, the collapsible screen may be a screen (e.g., a projector screen, or the like) configured to display an image output projected on it by a projection device 132. The projection device 132 may be configured to receive a signal, generate an image output based on the signal, and project the image output onto the one or more widescreen display devices 130. The projection device 132 may be mounted (e.g., coupled to a privacy shell element 108) proximate to the combined divan aircraft seat 118. The one or more widescreen display devices 130 (and the accompanying projection device 132) may be image-stabilized relative to the motion of a passenger aircraft including the aircraft passenger compartment suite 100.

The one or more widescreen display devices 130 may include a non-collapsible screen. For example, the non-collapsible screen may be a standalone display device (e.g., a monitor, a television, or the like) configured to receive a signal, generate an image output based on the signal, and display the image output.

The aircraft passenger compartment 100*a* may include one or more speakers configured to provide accompanying sound to media content being displayed on the one or more widescreen display devices 130. The aircraft passenger compartment 100*a* may include one or more lights, the operation of which may be tied to the operation of the one or more widescreen display devices 130 (e.g., a dimming function). The aircraft passenger compartment 100*a* may include one or more IFEs in addition to the one or more widescreen display devices 130.

The aircraft passenger compartment 100*a* of the aircraft passenger compartment suite 100 may include one or more stowage compartments 134. For example, a stowage compartment 134 may be configured to receive and hold (e.g., contain, secure, or the like) one or more passenger amenities including, but not limited to, one or more pieces of carry-on luggage, paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), food products, drink products, or the like. By way of another example, a stowage compartment 134 may include one or more electronic connections for one or more passenger amenities such as, but not limited to, one or more charging ports, one or more charging cables, or the like. By way of another example, a stowage compartment 134 may include one or more electronic connections in communication with one or more components of the aircraft passenger compartment suite 100 such as, but not limited to, one or more display device connection ports, one or more display device connection cables, one or more audio output jacks (e.g., headphone jacks), one or more audio input jacks, or the like. By way of another example, a stowage compartment 134 may include one or more safety devices (e.g., air masks, personal floatation devices, or the like). The one or more stowage compartments 134 may be coupled to and/or at least be partially inset in the one or more privacy shell elements 108, the one or more monuments 126, or the like.

The aircraft passenger compartments 100a in the side 102 may be accessible via a first aisle 138 of the aircraft cabin, while the aircraft passenger compartments 100a in the side 104 may be accessible via a second aisle 140 of the aircraft cabin.

Where the aircraft passenger compartment suite 100 includes the combined divan aircraft seat 118, multiple openings 110 in the privacy shell allowing access to the aircraft passenger compartment 100a with the combined divan aircraft seat 118 from the aisles 138, 140 may not be necessary (or allowed, depending on aviation guidelines and/or standards). In this case, the opening 110 may be replaced by a large stowage compartment 134, such that the aircraft passenger compartment 100a may only be accessed from the aisle 138 or the aisle 140.

The large stowage compartment 134 may include a door 136. For example, the large stowage compartment 134 with a door 136 may be a stowage compartment configured to receive long and/or large items (e.g., passenger amenities needing to be hung up, similar to a closet) that there may be a preference to stow in a substantially vertical orientation. By way of another example, the large stowage compartment 134 with the door 136 may be configured to contain items otherwise easily displaced by the motion of the plane including, but not limited to, bar supplies and/or barware, food items, drink items, or the like.

The door 136 may be hinged or otherwise configured to rotate or pivot about an axis. The door 136 may be configured to slide into a cavity defined within one or more privacy shell elements 108. It is noted herein, however, that the large stowage compartment 134 may be open to the aircraft passenger compartment 100a including the combined divan aircraft seat 118. Therefore, the above description should not be interpreted as a limitation on the scope of the disclosure but merely an illustration.

Although embodiments of the disclosure illustrate components as being installed within and/or related to the side 102 or the side 104, it is noted herein any discussion about components installed within and/or related to the side 102 may be applied to the side 104, and vice versa. Therefore, the above description should not be interpreted as a limitation on the scope of the disclosure but merely an illustration.

The aircraft passenger compartment suite 100 may be configured such that all seats 112, 118 face multiple directions. For example, the aircraft passenger compartment suite 100 may be configured such that the one or more aircraft seats 112 may face in a rearward or aft direction and the combined divan aircraft seat 118 may face in a forward or fore direction. By way of another example, the aircraft passenger compartment suite 100 may be configured such that the one or more aircraft seats 112 may face in a forward or fore direction and the combined divan aircraft seat 118 may face in a rearward or aft direction.

The aircraft passenger compartment suite 100 may be configured such that all seats 112, 118 face a single direction. For example, the aircraft passenger compartment suite 100 may be configured such that the one or more aircraft seats 112 and the combined divan aircraft seat 118 may be in a forward or fore direction. By way of another example, the aircraft passenger compartment suite 100 may be configured such that the one or more aircraft seats 112 and the combined divan aircraft seat 118 may be in a rearward or aft direction.

The aircraft cabin may be configured such that the passenger aircraft may include aircraft passenger compartment suites 100 with aircraft seats 112 and combined divan aircraft seats 118 installed in a 2/3/2 (or 2/4/2) arrangement (meaning a three- or four-passenger aircraft passenger compartment suite 100 flanked by a set of two-passenger aircraft passenger compartment suites 100). For example, the aircraft passenger compartment suites 100 may be separated by aisles.

In general, however, it is noted herein the aircraft passenger compartment suite 100 may be configured and/or positioned within the passenger aircraft such that the one or more aircraft seats 112 and/or the combined divan aircraft seat 118 may face any direction, subject to any aviation guidelines and/or standards. In addition, it is noted herein the aircraft passenger compartment suites 100 may be configured and/or positioned within the passenger aircraft in any arrangement, subject to any aviation guidelines and/or standards. Therefore, the above description should not be interpreted as a limitation on the scope of the disclosure but merely an illustration.

Although embodiments of the disclosure are directed to the aircraft passenger compartment 100a including the combined divan aircraft seat 118 being occupied by a primary passenger but usable by a guest passenger during select stages of flight, it is noted herein the aircraft passenger compartment 100a may be a space within the aircraft cabin shared by all passengers in the surrounding aircraft passenger compartments 100a. In this regard, the aircraft passenger compartment 100a including the combined divan aircraft seat 118 may not be sold to a passenger for a duration of a flight, but rather rented for a portion of the flight (e.g., similar to a conference space or a video space of an apartment, a business, or a school). It is noted herein the combined divan aircraft seat 118 may not need to transition into a lie-flat position with this set-up, but rather may remain in an upright position or have a capability to transition into one or more reclined positions. In addition, it is noted herein the decision to sell the aircraft passenger compartment 100a including the combined divan aircraft seat 118 or retain the aircraft passenger compartment 100a including the combined divan aircraft seat 118 may be made on a flight-to-flight, service provider-to-service provider basis. Therefore, the above description should not be interpreted as a limitation on the scope of the disclosure but merely an illustration.

Figure 4:
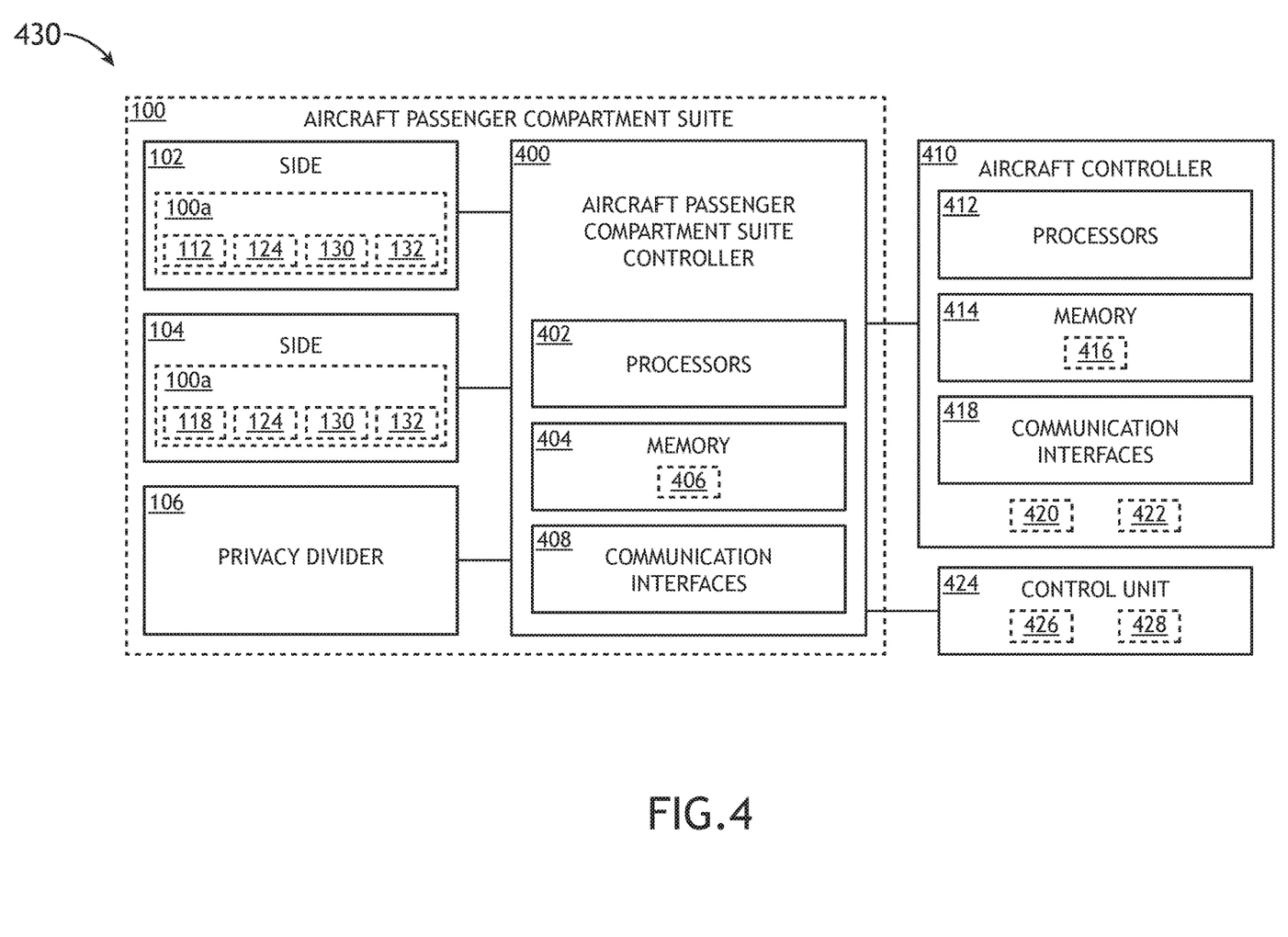
FIG. 4 illustrates a block diagram of an aircraft including an aircraft passenger compartment suite, in accordance with one or more embodiments of the disclosure.

FIG. 4 illustrates a block diagram of a passenger aircraft 430 including the aircraft passenger compartment suite 100, in accordance with one or more embodiments of the disclosure.

The passenger aircraft 430 may include one or more aircraft passenger compartment suite controllers 400 (e.g., in the aircraft passenger compartment suite 100). The one or more aircraft passenger compartment suite controllers 400 may include one or more processors 402 and memory 404.

The memory 404 may store one or more sets of program instructions 406. The one or more processors 402 may be configured to execute the one or more sets of program instructions 406 to carry out one or more of the various steps described throughout the present disclosure. The one or more aircraft passenger compartment suite controllers 400 may include one or more communication interfaces 408.

The one or more aircraft passenger compartment suite controllers 400 may be coupled (e.g., physically and/or communicatively coupled) to one or more components in an aircraft passenger compartment 100a of the side 102 (e.g., the one or more aircraft seats 112, the one or more ottomans 124, the one or more widescreen display devices 130, the one or more projection devices 132, or other components of the aircraft passenger compartment 100a of the side 102). The one or more aircraft passenger compartment suite controllers 400 may be coupled (e.g., physically and/or communicatively coupled) to one or more components in an aircraft passenger compartment 100a of the side 104 (e.g., the combined divan aircraft seat 118, the ottoman 124, the one or more widescreen display devices 130, the one or more projection devices 132, or other components of the aircraft passenger compartment 100a of the side 104). The one or more aircraft passenger compartment suite controllers 400 may be coupled (e.g., physically and/or communicatively coupled) to one or more components in the privacy divider 106.

The one or more aircraft passenger compartment suite controllers 400 may transmit instructions, power, control signals, data, or the like to the one or more components in the aircraft passenger compartments 100a of the side 102, the aircraft passenger compartments 100a of the side 104, and/or the privacy divider 106. The one or more aircraft passenger compartment suite controllers 400 may receive instructions, power, control signals, data, or the like from the one or more components in the aircraft passenger compartments 100a of the side 102, the aircraft passenger compartments 100a of the side 104, and/or the privacy divider 106.

The one or more aircraft passenger compartment suite controllers 400 may be coupled (e.g., physically and/or communicatively coupled) to one or more external aircraft controllers 410. The one or more aircraft controllers 410 may include one or more processors 412 and memory 414. The memory 414 may store one or more sets of program instructions 416. The one or more processors 412 may be configured to execute the one or more sets of program instructions 416 to carry out one or more of the various steps described throughout the present disclosure. The one or more aircraft controllers 410 may include one or more communication interfaces 418.

The one or more aircraft controllers 410 may be coupled to one or more display devices 420. The one or more aircraft controllers 410 may be coupled to one or more user input devices 422.

The one or more aircraft passenger compartment suite controllers 400 may be coupled to a control unit 424. The control unit 424 may be coupled to one or more display devices 426. The control unit 424 may be coupled to one or more user input devices 428. The passenger control unit 424 may be positioned in an aircraft passenger compartment 100a for use by a passenger. The passenger control unit 424 may be positioned on an external surface of the aircraft passenger compartment suite 100 for use by a crew member.

It is noted herein the control unit 424 may be considered to be at least a portion of the one or more aircraft passenger compartment suite controllers 400. For example, the control unit 424 may be a component of the one or more aircraft passenger compartment suite controllers 400. By way of another example, the control unit 424 may be integrated in the one or more aircraft passenger compartment suite controllers 400. In addition, it is noted herein the control unit 424 may be considered to include and/or be a passenger seat control unit, for purposes of the present disclosure.

The one or more processors 402, 412 may include any one or more processing elements known in the art. In this sense, the one or more processors 402, 412 may include any microprocessor device configured to execute algorithms and/or program instructions. In general, the term "processor" may be broadly defined to encompass any device having one or more processing elements, which execute a set of program instructions from a non-transitory memory medium (e.g., the memory 404, 414), where the one or more sets of program instructions 406, 416 are configured to cause the one or more processors 402, 412 to carry out any of one or more process steps.

The memory 404, 414 may include any storage medium known in the art suitable for storing the one or more sets of program instructions 406, 416 executable by the associated one or more processors 402, 412. For example, the memory 404, 414 may include a non-transitory memory medium. For instance, the memory 404, 414 may include, but is not limited to, a read-only memory (ROM), a random access memory (RAM), a magnetic or optical memory device (e.g., disk), a magnetic tape, a solid state drive, and the like. The memory 404, 414 may be configured to provide display information to the one or more display devices 420, 426. In addition, the memory 404, 414 may be configured to store user input information from the one or more user input devices 422, 428. The memory 404, 414 may be housed in a common controller housing with the one or more processors 402, 412. The memory 404, 414 may, alternatively or in addition, be located remotely with respect to the spatial location of the processors 402, 412, the one or more aircraft passenger compartment suite controllers 400 and/or the one or more aircraft controllers 410. For instance, the one or more processors 402, 412, the one or more aircraft passenger compartment suite controllers 400, and/or the one or more aircraft controllers 410 may access a remote memory 404, 414 (e.g., server), accessible through a network (e.g., internet, intranet, and the like) via one or more communication interfaces.

The one or more communication interfaces 408, 418 may be operatively configured to communicate with one or more components of the aircraft passenger compartment suite controller 400 and/or the one or more components of the aircraft controller 410. For example, the one or more communication interfaces 408, 418 may also be coupled (e.g., physically, electrically, and/or communicatively) with the one or more processors 402, 412 to facilitate data transfer between components of the one or more components of the aircraft passenger compartment suite controller 400 and/or the one or more components of the aircraft controller 410 and the one or more processors 402, 412. For instance, the one or more communication interfaces 408, 418 may be configured to retrieve data from the one or more processors 402, 412, or other devices, transmit data for storage in the memory 404, 414, retrieve data from storage in the memory 404, 414, or the like. By way of another example, the aircraft controller 410 and/or one or more offboard controllers may be configured to receive and/or acquire data or information from other systems or tools by a transmission medium that may include wireline and/or wireless portions. By way of another example, the aircraft controller 410 and/or the one or more offboard controllers may be configured to transmit data or information (e.g., the output of one or more procedures of the inventive concepts disclosed herein) to one or more systems or tools by a transmission medium that may include wireline and/or wireless portions (e.g., a transmitter, receiver, transceiver, physical connection interface, or any combination). In this regard, the transmission medium may serve as a data link between the aircraft controller 410 and/or the one or more offboard controllers and the other subsystems (e.g., of the passenger aircraft 430 and/or the aircraft passenger compartment suite 100). In addition, the aircraft controller 410 and/or the one or more offboard controllers may be configured to send data to external systems via a transmission medium (e.g., network connection).

Although the present disclosure is directed to the one or more aircraft passenger compartment suite controllers 400 and the one or more aircraft controllers 410 being separate, it is noted herein the one or more aircraft passenger compartment suite controllers 400 and the one or more aircraft controllers 410 may be the same and/or share select components. Therefore, the above description should not be interpreted as a limitation on the present disclosure but merely an illustration.

The one or more display devices 420, 426 may include any display device known in the art. For example, the one or more display devices 420, 426 may include, but are not limited to, a liquid crystal display (LCD), a light-emitting diode (LED) based display, an organic light-emitting diode (OLED) based display, an electroluminescent display (ELD), an electronic paper (E-ink) display, a plasma display panel (PDP), a display light processing (DLP) display, a cathode-ray tube (CRT), or the like. Those skilled in the art should recognize that a variety of display devices 420, 426 may be suitable for implementation in the present invention and the particular choice of display device may depend on a variety of factors, including, but not limited to, form factor, cost, and the like. In a general sense, any display device capable of integration with the user input device (e.g., touchscreen, bezel mounted interface, keyboard, mouse, trackpad, and the like) is suitable for implementation in the present invention.

The one or more user input devices 422, 428 may include any user input device known in the art. For example, the one or more user input devices 422, 428 may include, but are not limited to, a keyboard, a keypad, a touchscreen, a lever, a knob, a scroll wheel, a track ball, a switch, a dial, a sliding bar, a scroll bar, a slide, a handle, a touch pad, a paddle, a steering wheel, a joystick, a bezel input device, or the like. In the case of a touchscreen interface, those skilled in the art should recognize that a large number of touchscreen interfaces may be suitable for implementation in the present invention. For instance, the one or more display devices 420, 426 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of a display device is suitable for implementation in the present invention. In another embodiment, the input devices may include, but is not limited to, a bezel mounted interface.

Although embodiments of the present disclosure are directed to the one or more display devices 420, 426 being indirectly coupled to the corresponding one or more user input devices 422, 428 indirectly (e.g., via the one or more aircraft passenger compartment suite controllers 400 and/or the one or more aircraft controllers 410), it is noted herein the one or more display devices 420, 426 may be directly coupled to the corresponding one or more user input devices 422, 428. For example, the one or more display devices 420, 426 may be housed with the one or more user input devices 422, 428 in a common user interface housing. Therefore, the above description should not be interpreted as a limitation on the present disclosure but merely an illustration.

It is noted herein that any embodiments directed to the display devices 402, 426 and/or the user input devices 422, 428 may be directed to IFEs installed within the aircraft passenger compartment suite 100 (e.g., the one or more widescreen display devices 130, or the like). Therefore, the above description should not be interpreted as a limitation on the present disclosure but merely an illustration.

Although embodiments of the present disclosure illustrate the actuation of components of the aircraft passenger compartment suite 100 via the control unit 424 (e.g., where the components are driven via a motor), it is noted herein that one or more components of the aircraft seats 112, 118 may be actuated by engaging a handle that activates one or more analog mechanical assemblies. Therefore, the above description should not be interpreted as a limitation on the scope of the disclosure but merely an illustration.

Although the present disclosure is directed to the aircraft passenger compartment suite 100 being installed in the passenger aircraft 430, it is noted herein the aircraft passenger compartment suite 100 may be installed within any number of environments. For example, the environment may include any type of vehicle known in the art. For instance, the vehicle may be any air, space, land, or water-based personal equipment or vehicle; any air, space, land, or water-based commercial equipment or vehicle; any air, space, land, or water-based military equipment or vehicle known in the art. By way of another example, the environment may include a commercial or industrial establishment (e.g., a home or a business).

It is noted herein that one or more components of the aircraft passenger compartment suite 100 may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft passenger compartment suite in an aircraft cabin of a passenger aircraft, comprising:
   at least one single passenger compartment including at least one single aircraft seat, the at least one single aircraft seat configured to seat a single passenger;
   a combined divan passenger compartment including a combined divan aircraft seat, the combined divan aircraft seat configured to seat at least one passenger, the combined divan aircraft seat having a width greater than a width of the at least one single aircraft seat, the combined divan aircraft seat configured to actuate between a combined divan upright position and a combined divan lie-flat position;

a privacy divider separating the combined divan passenger compartment and the at least one single passenger compartment; and a privacy shell including at least one privacy shell element, the at least one privacy shell element configured to conform to a portion of the combined divan aircraft seat, a first section of the at least one privacy shell element configured to engage with an adjacent section of an adjacent privacy shell element of an adjacent aircraft passenger compartment suite, the aircraft passenger compartment suite being positioned within the passenger aircraft between a first aisle and a second aisle, the first aisle and the second aisle being configured in a longitudinal orientation along a longitudinal direction of the aircraft cabin, the first aisle being parallel to the second aisle, the at least one single passenger compartment being accessible from the first aisle and the second aisle, the combined divan passenger compartment being accessible from the first aisle.

2. The aircraft passenger compartment suite of claim 1, the combined divan aircraft seat in the combined divan passenger compartment facing forward within the aircraft cabin, the at least one single aircraft seat in the at least one single passenger compartment facing rearward within the aircraft cabin.

3. The aircraft passenger compartment suite of claim 1, the combined divan aircraft seat in the combined divan passenger compartment facing rearward within the aircraft cabin, the at least one single aircraft seat in the at least one single passenger compartment facing forward within the aircraft cabin.

4. The aircraft passenger compartment suite of claim 1, the combined divan aircraft seat in the combined divan passenger compartment and the at least one single aircraft seat in the at least one single passenger compartment facing outward from the privacy divider.

5. The aircraft passenger compartment suite of claim 1, the combined divan aircraft seat including a primary section and an auxiliary section, the primary section configured to actuate between the combined divan upright position and the combined divan lie-flat position.

6. The aircraft passenger compartment suite of claim 1, the combined divan aircraft seat in the combined divan passenger compartment and the at least one single aircraft seat in the at least one single passenger compartment facing inward toward the privacy divider.

7. The aircraft passenger compartment suite of claim 6, a portion of the combined divan aircraft seat configured to be positioned underneath the privacy divider when the combined divan aircraft seat is in the combined divan lie-flat position.

8. The aircraft passenger compartment suite of claim 1, the combined divan passenger compartment further comprising:

a stowage compartment configured to stow passenger amenities in a substantially vertical orientation, the stowage compartment proximate to the combined divan aircraft seat, the stowage compartment of the combined divan passenger compartment preventing access from the second aisle.

9. The aircraft passenger compartment suite of claim 8, the stowage compartment including a door.

10. The aircraft passenger compartment suite of claim 1, the combined divan passenger compartment further comprising:

an ottoman proximate to the combined divan aircraft seat.

11. The aircraft passenger compartment suite of claim 10, the combined divan aircraft seat and the ottoman configured to form a bed surface when the combined divan aircraft seat is in the combined divan lie-flat position and the ottoman is in an ottoman lie-flat position.

12. The aircraft passenger compartment suite of claim 10, the ottoman positioned underneath a monument of the privacy divider.

13. An aircraft passenger compartment suite in an aircraft cabin of a passenger aircraft, comprising:

a combined divan passenger compartment, comprising:
a combined divan passenger compartment including a combined divan aircraft seat, the combined divan aircraft seat configured to seat at least one passenger, the combined divan aircraft seat having a width greater than a width of a single aircraft seat, the combined divan aircraft seat configured to actuate between a combined divan upright position and a combined divan lie-flat position; and a stowage compartment configured to stow passenger amenities in a substantially vertical orientation, the stowage compartment proximate to the combined divan aircraft seat, the aircraft passenger compartment suite being positioned within a passenger aircraft between a first aisle and a second aisle, the first aisle and the second aisle being configured in a longitudinal orientation along a longitudinal direction of the aircraft cabin, the first aisle being parallel to the second aisle, the at least one single passenger compartment being accessible from the first aisle and the second aisle, the combined divan passenger compartment being accessible from the first aisle, the stowage compartment of the combined divan passenger compartment preventing access from the second aisle.

* * * * *